(12) United States Patent
Yan et al.

(10) Patent No.: US 10,635,890 B2
(45) Date of Patent: Apr. 28, 2020

(54) FACIAL RECOGNITION METHOD AND APPARATUS, ELECTRONIC DEVICE, AND STORAGE MEDIUM

(71) Applicant: Shenzhen Intellifusion Technologies Co., Ltd., Shenzhen (CN)

(72) Inventors: Rui Yan, Shenzhen (CN); Yongqiang Mou, Shenzhen (CN)

(73) Assignee: SHENZHEN INTELLIFUSION TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/476,307
(22) PCT Filed: Jul. 3, 2018
(86) PCT No.: PCT/CN2018/094368
§ 371 (c)(1),
(2) Date: Jul. 8, 2019
(87) PCT Pub. No.: WO2019/011165
PCT Pub. Date: Jan. 17, 2019

(65) Prior Publication Data
US 2020/0042770 A1    Feb. 6, 2020

(30) Foreign Application Priority Data
Jul. 14, 2017  (CN) .......................... 2017 1 0577220

(51) Int. Cl.
G06K 9/00     (2006.01)
G06T 7/11     (2017.01)
G06K 9/62     (2006.01)

(52) U.S. Cl.
CPC ..... G06K 9/00234 (2013.01); G06K 9/00268 (2013.01); G06K 9/00288 (2013.01);
(Continued)

(58) Field of Classification Search
CPC .......... G06K 9/00288; G06K 9/00268; G06K 9/00281; G06K 9/6202; G06K 9/629;
(Continued)

(56) References Cited

U.S. PATENT DOCUMENTS

2006/0158307 A1    7/2006  Lee et al.
2015/0205997 A1*   7/2015  Ma ..................... G06K 9/00261
                                                382/118

FOREIGN PATENT DOCUMENTS

CN    102855496 A    1/2013
CN    103902962 A    7/2014
(Continued)

OTHER PUBLICATIONS

Partially occluded face recognition using subface hidden Markov modelsPu Xiaorong ; Zhou Zhihu ; Tan Heng ; Lu Tai2012 7th International Conference on Computing and Convergence Technology (ICCCT)Year: 2012 | Conference Paper | Publisher: IEEE (Year: 2012).*

(Continued)

Primary Examiner — Kim Y Vu
Assistant Examiner — Michael J Vanchy, Jr.

(57) ABSTRACT

The present invention provides a facial recognition method, including: obtaining a target facial image; determining a covered region and a non-covered region of the target facial image; calculating the weight of the covered region, and calculating the weight of the non-covered region; extracting feature vectors of the covered region, and extracting feature vectors of the non-covered region; comparing the target facial image with each template facial image in a facial database according to the feature vectors of the covered region, the feature vectors of the non-covered region, the weight of the covered region, and the weight of the non-covered region, to calculate a facial similarity between each template facial image and the target facial image; and determining, when at least one of the facial similarities between the template facial images and the target facial image is greater than or equal to a similarity threshold, that facial recognition succeeds.

15 Claims, 3 Drawing Sheets

(52) U.S. Cl.
CPC .............. *G06K 9/6215* (2013.01); *G06T 7/11*
(2017.01); *G06T 2207/10024* (2013.01); *G06T
2207/20084* (2013.01); *G06T 2207/30201*
(2013.01)

(58) Field of Classification Search
CPC ............. G06K 9/4642; G06K 9/00221; G06K
9/4609; G06K 9/4671; G06T 7/11
See application file for complete search history.

(56) References Cited

FOREIGN PATENT DOCUMENTS

| | | |
|---|---|---|
| CN | 105654033 A | 6/2016 |
| CN | 106709404 A | 5/2017 |
| CN | 107292287 A | 10/2017 |

OTHER PUBLICATIONS

International Search Report for PCT/CN2018/094368.
International Publication for PCT/CN2018/094368.
Written Opinion of the International Searching Authority for PCT/CN2018/094368.

* cited by examiner

FACIAL RECOGNITION METHOD AND APPARATUS, ELECTRONIC DEVICE, AND STORAGE MEDIUM

CROSS-REFERENCE TO RELATED APPLICATIONS

This application claims the benefit of priority from Chinese Patent Application NO. 201710577220.4 entitled "FACIAL RECOGNITION METHOD AND APPARATUS, ELECTRONIC DEVICE, AND STORAGE MEDIUM" and filed on Jul. 14, 2017, the content of which is hereby incorporated in its entire by reference.

FIELD

The present disclosure relates to the field of monitoring technology, and more particularly, to a facial recognition method, an facial recognition apparatus, an electronic device, and a storage medium.

BACKGROUND

With the development and progress of artificial intelligence technology, facial recognition technology has been widely used in every aspect of social life, such as, the attendance system based on facial recognition, identification at entry and exit points, etc., which greatly facilitate people's work and life. However, in the existing facial recognition technology, facial recognition requires the cooperation of users to a certain extent. In the case that the face is covered by a large area (such as wearing sunglasses, masks etc.), the global feature information will be interfered, and the difficulty of facial recognition will increase obviously, and the facial recognition accuracy will decrease sharply. Thus, in many scenarios, the accuracy of the existing facial recognition methods is low.

SUMMARY

Exemplary embodiments of the present disclosure provide a facial recognition method, an apparatus, an electronic device, and a storage medium, which improve the accuracy of facial recognition when the face is covered by a large area.

An facial recognition method, includes:

obtaining a target facial image;

when it is determined that there is a cover that covers a face in the target facial image, performing image segmentation on the target facial image and obtaining a covered region of the target facial image and a non-covered region of the target facial image;

calculating weight of the covered region and calculating, weight of the non-covered region;

extracting feature vectors of the covered region and extracting feature vectors of the non-covered region;

comparing the target facial image with each template facial image in a facial database according to the feature vectors of the covered region, the feature vectors of the non-covered region, the weight of the covered region and the weight of the non-covered region, to calculate a facial similarity between each template facial image and the target facial image; and determining that facial recognition succeeds, when at least one of the facial similarities between the template facial images and the target facial image is greater than or equal to a similarity threshold.

In one embodiment, the step of performing image segmentation on the target facial image and obtaining a covered region of the target facial image and a non-covered region of the target facial image, includes:

performing binarization processing on the target facial image by use of a color difference between a color of the cover and a color of the face, to obtain a binarization facial image;

segmenting the binarization facial image into a black region and a white region by use of an edge detection algorithm;

determining the black, region, as the covered region of the target facial image and determining the white region as the ion-covered region of the target facial image.

In one embodiment the step of calculating weight of the covered region, includes:

calculating covered area of the covered region and/or gradation degree of covered color of the covered region;

determining the weight of the covered region according to an inversely proportional relationship between the covered area of the covered region and/or the gradation degree of covered color of the covered region and the weight of the covered region;

performing normalization on the weight of the covered region.

In one embodiment, the step of calculating weight of the non-covered region, includes:

identifying a facial features region in the non-covered region;

calculating a proportion of the facial features region in the non-covered region;

determining the weight of the non-covered region according to a direct proportion relationship between the proportion of the facial features region in the non-covered region and the weight of the non-covered region;

performing normalization on the weight of the non-covered region.

In one embodiment, the step of extracting feature vectors of the covered region and extracting feature vectors of the non-covered region, includes:

obtaining a pre-trained face feature, extraction network model, wherein the pre-trained face feature extraction network model is obtained by training at least one category of facial sample images, and the facial sample images of the same person belong to the same category;

taking images of the covered region as input of the pre-trained face feature extraction network model, and calculating the feature vectors of the covered region by using a convolutional neural network method;

taking images of the non-covered region as the input of the pre-trained face feature extraction network model, and calculating the feature vectors of the non-covered region by using the convolutional neural network method.

In one embodiment, the step of comparing the target facial image with each template facial image in a facial database according to the feature vectors of the covered region, the feature vectors of the non-covered region, the weight of the covered region and the weight of the non-covered region, to calculate a facial similarity between each template facial image and the target facial image, includes:

(a) for any template facial image in the template facial images, comparing the feature vectors of the covered region with the feature vector of any template facial image, to calculate a first similarity between any template facial image and the covered region;

(b) comparing the feature vectors of the non-covered region with the feature vector of any template facial image, to calculate a second similarity between any template facial image and the non-covered region;

calculating the facial similarity between any template facial image and the target facial image according to the weight of the covered region, the weight of the non-covered region, the first similarity between any template facial image and the covered region, and the second similarity between any template facial image and the non-covered region;

(d) performing the steps (a), (b) and (c) for each template facial image until the facial similarity between each template facial image and the target facial image is calculated.

In one embodiment, after the step of obtaining a target facial image, the facial recognition method further includes:

determining whether there is a cover that covers the face in the target facial image or not;

the step of determining whether there is a cover that covers the face in the target facial image or not, includes:

obtaining a reconstruction facial image;

calculating a difference value between the target facial image and the reconstruction facial image;

determining that there is a cover that covers the face in the target facial image when the difference value is greater than or equal to a difference threshold value.

A facial recognition apparatus includes:

an obtaining module, configured to obtain a target facial image;

a segmenting module, configured to, perform image segmentation on the target facial image and obtain a covered region of the target facial image and a non-covered region of the target, facial image when it is determined, that there is a cover that covers a face in the target facial image;

a weight calculating module, configured to calculate weight of the covered region and calculate weight of the non-covered region;

an extracting module, configured to extract feature vectors of the covered region and extract feature vectors of the non-covered region;

a similarity calculating module, configured to compare the target facial image with each template facial image in a facial database according to the feature vectors of the covered region, the feature vectors of the non-covered region, the weight of the covered region and the weight of the non-covered region, to calculate a facial similarity between each template facial image and the target facial image;

a recognizing module, configured to determine that facial recognition succeeds, when at least one of the facial similarities, between the template facial images and the target facial image is greater than or equal to a similarity threshold.

In one embodiment, the segmenting module configured to perform image segmentation on the target facial image and obtain a covered region of the target facial image and a non-covered region of the target facial image, includes:

the segmenting module further configured to:

perform binarization processing on the target facial image by use of a color difference between a color of the cover and a color of the face, to obtain a binarization facial image;

segment the binarization facial image into a black region and a white region by use of an edge detection algorithm;

determine the black region as the covered region of the target facial image and determine the white region as the non-covered region of the target facial image.

In one embodiment, the weight calculating module configured to calculate weight of the covered region, includes:

the weight calculating module further configured to:

calculate covered area of the covered region and/or gradation degree of covered color of the covered region;

determine the weight of the covered region according to an inversely proportional relationship between the covered area of the covered region and/or the gradation degree of covered color of the covered region and the weight of the covered region;

perform normalization on the weight of the covered region.

In one embodiment, the weight calculating module configured to calculate weight of the non-covered region, includes:

the weight calculating module further configured to:

identify a facial features region in the non-covered region;

calculate a proportion of the facial features region in the non-covered region;

determine the weight of the non-covered region according to a direct proportion relationship between the proportion of the facial features region in the non-covered region and the weight of the non-covered region;

perform normalization on the weight of the non-covered region.

In one embodiment, the extracting module configured to extract feature vectors of the covered region and extract feature vectors of the non-covered region, includes:

the extracting module further configured to:

obtain a pre-trained face feature extraction network model wherein the pre-trained face feature extraction network model is obtained by training at least one category of facial sample images, and the facial sample images of the same person belong to the same category;

take images of the covered region as input of the pre-trained face feature extraction network model, and calculate the feature vectors of the covered region by using a convolutional neural network method;

take images of the non-covered region as the input of the pre-trained face feature extraction network model, and calculate the feature vectors of the non-covered region by using the convolutional neural network method.

In one embodiment, the similarity calculating module configured to compare the target facial image with each template facial image in a facial database according to the feature vectors of the covered region, the feature vectors of the non-covered region, the weight of the covered region and the weight of the non-covered region, to calculate a facial similarity between each template facial image and the target facial image, includes:

the similarity calculating module further configured to:

(a) for any template facial image in the template facial images, compare the feature vectors of the covered region with the feature vector of any template facial image, to calculate a first similarity between any template facial image and the covered region;

(b) compare the feature vectors of the non-covered region with the feature vector of any template facial image, to calculate a second similarity between any template facial image and the non-covered region;

(c) calculate the facial similarity between any template facial image and the target facial image according to the weight of the covered region, the weight of the non-covered region, the first similarity between any template facial image and the covered region, and the second similarity between any template facial image and the non-covered region;

(d) perform the steps (a), (b) and (c) for each template facial image until the facial similarity between each template facial image and the target facial image is calculated.

In one embodiment, the facial recognition apparatus further includes:

a determining module, configured to determine whether there is a cover that covers the face in the target facial image or not after the obtaining module obtains the target facial image;

the determining module configured to determine whether there is a cover that covers the face in the target facial image or not, includes:

the determining module further configured to:

obtain a reconstruction facial image;

calculate a difference value between the target facial image and the reconstruction facial image;

determine that there is a cover that covers the face in the target facial image when the difference value is greater than or equal to a difference threshold value.

An electronic device includes a memory for storing at least one instruction and a processor, the processor for executing the at least one instruction stored in the memory to implement steps of the facial recognition method mentioned above.

A computer-readable storage medium, on which at least one computer instruction is stored, the at least one computer instruction for execution by one or more processor of a computer having a display to implement steps of the facial recognition method mentioned above.

As can be seen from the above technical solution, the facial recognition method and apparatus can obtain a target facial image, when it is determined that there is a cover that covers a face in the target facial image, perform image segmentation on the target facial image, and obtain a covered region of the target facial image and a non-covered region of the target facial image, calculate weight of the covered region and weight of the non-covered region, extract feature vectors of the covered region and the feature vectors of the non-covered region, and compare the target facial image with each template facial image in a facial database according to the feature vectors of the covered region, the feature vectors of the non-covered region, the weight of the covered region and the weight of the non-covered region, to calculate a facial similarity between each template facial image and the target facial image, and determine that facial recognition succeeds, when at least one of the facial similarities between the template facial images and the target facial image is greater than or equal to a similarity threshold. The present invention can improve the accuracy of facial recognition, when the face is covered by a large area.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the invention, for persons of ordinary skills in this field, other drawings can be obtained according to the drawings below on the premise of no creative work.

DETAILED DESCRIPTION

Reference will now be made in detail to embodiments, examples of which are illustrated in the accompanying drawings. In the following detailed description, numerous specific details are set forth in order to provide a thorough understanding of the subject matter presented, herein. But it will be apparent to one skilled in the art that the subject matter may be practiced without these specific details. Based on the embodiments of the invention, all other embodiments obtained by persons of ordinary skills in this field without creative work shall fall within the protection scope of the present disclosure.

In order to make the above purposes, features and advantages of the present invention more obvious and easy to understand, the present invention is further described in detail below in combination with the drawings and specific implementation embodiments.

Figure 1:
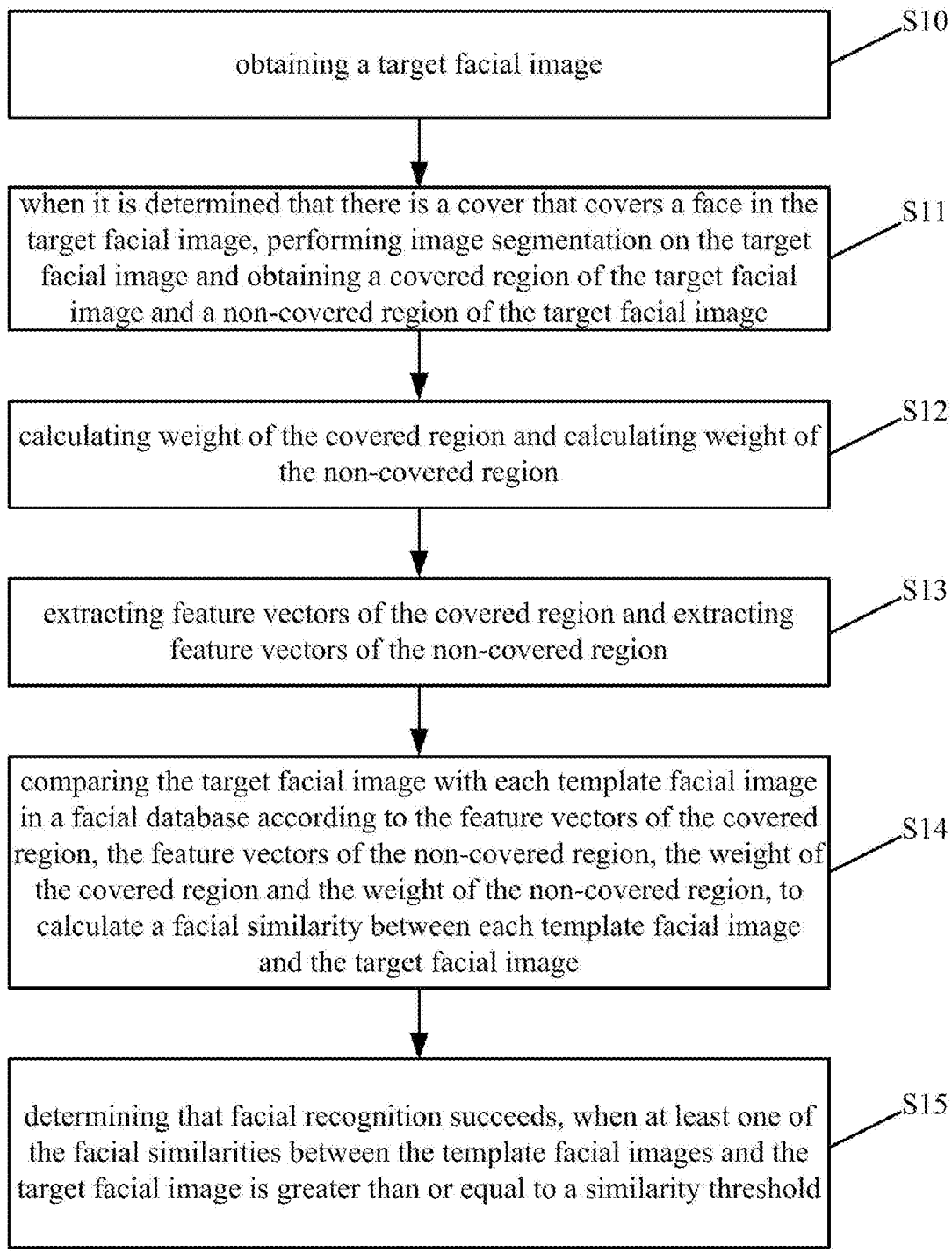
FIG. 1 is a flowchart of a facial recognition method provided in one embodiment of the present invention.

Referring to FIG. 1, FIG. 1 is a flowchart of a facial recognition method provided in one embodiment of the present invention. Understandably, the sequence of steps in this flowchart can be changed and some steps can be omitted depending on different requirements. The facial recognition method in this embodiment of the present invention includes:

S10, obtaining a target facial image by an electronic device.

In at least one embodiment of the invention, the electronic device can capture images, a facial detection method is used to perform facial detection on captured images, and the target facial images are obtained from the captured images. In other embodiments, the electronic device can also read the target facial images from a storage device. The storage device can be an external storage device or a memory of the electronic device. The form of the image captured by the electronic device may include either dynamic acquisition or static acquisition.

S11, when it is determined that there is a cover that covers a face in the target facial image, performing image segmentation on the target facial image and obtaining a covered region of the target facial image and a non-covered region of the target facial image by the electronic device.

In at least one embodiment of the invention, after the step of obtaining a target facial image, the method includes:

determining whether there is a cover that covers the face in the target facial image or not.

In one embodiment, the step of determining whether there is a cover that covers the face in the target facial image or not, includes:

obtaining a reconstruction facial image; calculating a difference value between the target facial image and the reconstruction facial image; determining that there is a cover that covers the face in the target facial image when the difference value is greater than or equal to a difference threshold value; determining that there is not a cover that covers the face in the target facial image when the difference value is less than the difference threshold value.

Further, the electronic device can determine whether there is, a cover that covers the face in the target facial, image by use of a principal component analysis (PCA). In detail, the principal component analysis can be used to perform dimensionality reduction on facial images by means of selecting pivot element features, and the data after dimensionality reduction can still maintain main features of the face. Thus, the recognition of the data after dimensionality reduction can greatly reduce the amount of calculation, that is, the amount of calculation can be greatly reduced by recognizing the data after dimensionality reduction.

In one embodiment, the method of determining whether there is a cover that covers the face in the target facial image by use of a principal component analysis, includes:

$$m + \sum_{i=1}^{n} y_i v_i$$

is used to represent the reconstruction facial image, where m is an average face vector, which can be obtained by averaging facial sample images in a facial sample image set; $v_i$ is a vector representing the correlation between elements in the facial images. A covariance matrix can be obtained according to the facial sample images in the facial sample image set, and then a feature vector of the covariance matrix can be calculated, to obtain the vector $v_i$. The elements include, but not limited to: pixels. i is used to represent the i-th feature vector. n represents the total number of feature vectors, and $y_i$ represents the coefficient of linear combination, which represents the degree of importance of the i-th feature vector.

$$e = m + \sum_{i=1}^{n} y_i v_i - x$$

represents a difference vector between the target facial image x and the reconstruction facial image, and ||e|| represents the difference value between the target facial image and the reconstruction facial image. The larger the difference value ||e|| is, the greater the probability and the severity that the target facial image is covered will be.

In at least one embodiment of the present invention, when it is determined that there is a cover that covers the face in the target facial image, because a color of the cover is very different from a color of the face, that is, because there is a big color difference between the color of the cover and the color of the face, so the target facial image can be segmented by use of the color difference between the color of the cover and the color of the face, and the covered region of the target facial image and the non-covered region of the target facial image are obtained. That is, because the color of the cover is very different from the color of the face, so the target facial image can be performed the image segmentation on the target facial image by use of the color difference between the color of the cover and the color of the face, and the covered region of the target facial image and the non-covered region of the target facial image are obtained.

In one embodiment, the binarization processing is performed on the target facial image by use of the color difference between the color of the cover and the color of the face, to obtain a binarization facial image, that is, the target facial image is processed by binarization to obtain a binarization facial image by use of the color difference between the color of the cover and the color of the face, and the binarization facial image is, segmented into a black region and a white region by use of an edge detection algorithm. The black region is determined as the covered region of the target facial image, and the white region is determined as the non-covered region of the target facial image.

Furthermore, the black region and the white region can be placed in geometric shapes, that is, the black region and the white region can be enclosed in the geometric shapes. A black region or a white region can placed in a corresponding geometric shape (such as a rectangular box). The black region can be one or more, and the white region can be one or more.

S12, calculating weight of the covered region and calculating weight of the non-covered region by the electronic device.

In at least one embodiment of the invention, a covered region corresponds to the weight of a covered region. For any covered region, the step of calculating weight of the covered region, includes:

calculating covered area of the covered region and/or gradation degree of covered color of the it covered region; determining the weight of the covered region according to an inversely proportional relationship between the covered area of the covered region and/or the gradation degree of covered color of the covered, region and the weight of the covered region; performing normalization on the weight of the covered region.

There are a lot kind of normalization methods, such as the normalization based on linear function, the normalization based on logarithmic function transformation. After the normalization for the weight of each covered region, it can avoid that input variables with different physical significance and dimension cannot be used equally, where the input variables can be: the covered area of the covered region and initial weight of the covered region, or the covered area of the covered region and the gradation degree of covered color of the covered region, etc.

When the larger the covered area of the covered region is, the smaller the weight of the covered region will be. When the larger the gradation degree of covered color of the covered region is the smaller the weight of the covered region will be. When the weight of the covered region is smaller, that is, when the weight of the cover is smaller, the contribution rate of the cover is smaller during the process of facial recognition, which can reduce the impact of the covered region on facial recognition and improve the accuracy of facial recognition.

The gradation degree of covered color of the covered region can be measured by numerical value. The darker the covered color of the covered region is, the larger the numerical value will be. The gray value of each pixel in the covered region can be accumulated, and then averaged to obtain an average gray value of each pixel in the covered region, and the average gray value can be taken as a gray value of the covered region. The gradation degree of covered color of the covered region can be determined according to the gray value of the covered region.

In one embodiment, when the weight of the covered region is determined according to the inversely proportional relationship between the covered area of the covered region and the weight of the covered region, the weight of the covered region is equal to the initial weight of the covered region divided by the covered area of the covered region, that is, the weight of the covered region can be obtained by dividing the initial weight of the covered region by the covered area of the covered region. In one embodiment, the initial weight of the covered region can be set in advance, or be obtained according to other means, such as, random variables generated by random functions, etc., or a proportion of the covered region to the target facial image, etc.

In one embodiment, when the weight of the covered region is determined according to the inversely proportional relationship between the gradation degree of covered color of the covered region and the weight of the covered region, the weight of the covered region is equal to the initial weight of the covered region divided by the gradation degree of covered color of the covered region, that is, the weight of the covered region can be obtained by dividing the initial weight of the covered region by the gradation degree of covered color of the covered region. In one embodiment, the initial weight of the covered region can be set in advance, or be obtained according to other means, such as, random variables generated by random functions etc., or the proportion of the covered region to the target facial image, etc.

In one embodiment, when the weight of the covered region is determined according to the inversely proportional relationship between the covered area of the covered region and the gradation degree of covered color of the covered region and the weight of the covered region, the weight of the covered region is equal to the initial weight of the covered region divided by a product of the covered area of the covered region and the gradation degree of covered color of the covered region, that is, the weight of the covered region can be obtained by dividing the initial weight of the covered region by the product of the covered area of the covered region and the gradation degree of covered color of the covered region. In one embodiment, the initial weight of the covered region can be set in advance, or be obtained according to other means, such as, random variables generated by random functions, etc., or the proportion of the covered region to the target, facial image, etc.

In at least one embodiment of the invention, a non-covered region corresponds to a weight of the non-covered region. For any non-covered region, the step of calculating weight of the non-covered region, includes:

identifying a facial features region in the non-covered region; calculating a proportion of the facial features region in the non-covered region; determining the weight of the non-covered region according to a direct proportion relationship between the proportion of the facial features region in the non-covered region and the weight of the non-covered region; performing normalization on the weight of the non-covered region.

There are a lot kind of normalization methods such as the normalization based on linear function, the normalization based on logarithmic function transformation. After the normalization for the weight of each non-covered region, it can avoid that input variables (such as, the proportion of the facial features region in the non-covered region, and initial weight of the non-covered region) with different physical, significance and dimension cannot be used equally.

In one embodiment, the weight of the non-covered region is equal to the initial weight of the non-covered region multiplying the proportion of the facial features region in the non-covered region, that is, the weight of the non-covered region can be obtained by multiplying the initial weight of the non-covered region by the proportion of the facial features region in the non-covered region. In one embodiment, the initial weight of the non-covered region can be set in advance, or be obtained according to other means, such as, random variables generated by random functions, etc., or the proportion of the non-covered region to the target facial image, etc.

S13, extracting feature vectors of the covered region and extracting feature vectors of the non-covered region by the electronic device.

In at least one embodiment of the invention, the step of extracting feature vectors of the covered region and extracting feature vectors of the non-covered region, includes:

obtaining a pre-trained face feature extraction network model, where the pre-trained face feature extraction network model can be obtained by training at least one category of facial sample images, and the facial sample images of the same person belong to the same category; taking images of the covered region as input of the pre-trained face feature extraction network model, and calculating the feature vectors of the covered region by using a convolutional neural network method; taking images of the non-covered region as the input of the pre-trained face feature extraction network model, and calculating the feature vectors of the non-covered region by using the convolutional neural network method.

S14, comparing the target facial image with each template facial image in a facial database according to the feature vectors of the covered region, the feature vectors of the non-covered region, the weight of the covered region and the weight of the non-covered region, to calculate a facial similarity between each template facial image and the target facial image.

In at least one embodiment of the invention, for any template facial image in the template facial images, the step of comparing the target facial image with each template facial image in a facial database according to the feature vectors of the covered region, the feature vectors of the non-covered region, the weight of the covered region and the weight of the non-covered region, to calculate a facial similarity between each template facial image and the target facial image, includes:

(a) comparing the feature vectors of the covered region with the feature vector of any template facial image, to calculate a first similarity between any template facial image and the covered region;

(b) comparing the feature vectors of the non-covered region with the feature vector of any template facial image, to calculate a second similarity between any template facial image and the non-covered region;

(c) calculating the facial similarity between any template facial image and the target facial image according to the weight of the covered region, the weight of the non-covered region, the first similarity between any template facial image and the covered region, and the second similarity between any template facial image and the non-covered region;

(d) performing the steps (a), (b) and (c) for each template facial image until the facial similarity between each template facial image and the target facial image is calculated.

The facial similarity between any template facial image and the target facial image is equal to (the first similarity between any template facial image and the covered region multiplied by the weight of the covered region)+(the second similarity between any template facial image and the non-covered region multiplied by the weight of the non-covered region). That is, the facial similarity between any template facial image and the target facial image is equal to the sum of (the first similarity between any template facial image and the covered region multiplied by the weight of the covered region) and (the second similarity between any template facial image and the non-covered region multiplied by the weight of the non-covered region).

For example, the target facial image is divided into two covered regions and three non-covered regions, namely, a first covered region and a second covered region, a first non-covered region, a second non-covered region and a third non-covered region. A similarity between a template facial image and the first covered region is 0.2, and the similarity between the template facial image and the second covered region is 0.4. The similarity between the template facial image and the first non-covered region is 0.3, the similarity between the template facial image and the second non-covered region is 0.5, and the similarity between the template facial image and the third non-covered region is 0.8. The weight of the first covered region is 0.05, the weight of the second covered region 0.08, the weight of the first non-covered region is 0.8, the weight of the second non-covered region is 0.9, and the weight of the third non-covered region is 0.7. Thus, the facial similarity between the template facial image and the target facial image is equal to (0.2*0.05+0.4*0.08−0.3*0.8+0.5*0.9+0.8*0.7).

S15, determining that facial recognition succeeds by the electronic device, when at least one of the facial similarities between the template facial images and the target facial image is greater than or equal to a similarity threshold.

In at least one embodiment of the invention, when the facial recognition is determined successfully, that is, when the facial recognition is determined to be successful it can be determined that the at least one template facial image and the target facial image belong to the same person.

When all the template facial images have the facial similarities to the target facial image that are less than the similarity threshold according to the facial similarity between each template facial image and the target facial image, then the electronic device determines that the facial recognition fails. That is, when the facial similarities between all the template facial images and the target facial image are less than the similarity threshold according to the facial similarity between each template facial image and the target facial image, then the electronic device determines that the facial recognition fails.

When the face is covered by a cover, the facial recognition method of the invention, can reduce the contribution of the cover to the calculation of the similarity between the target facial image and the template facial image, by reducing the weight of the cover in the process of facial recognition, which can reduce the impact of the cover on facial recognition and improve the accuracy of facial recognition.

Figure 2:
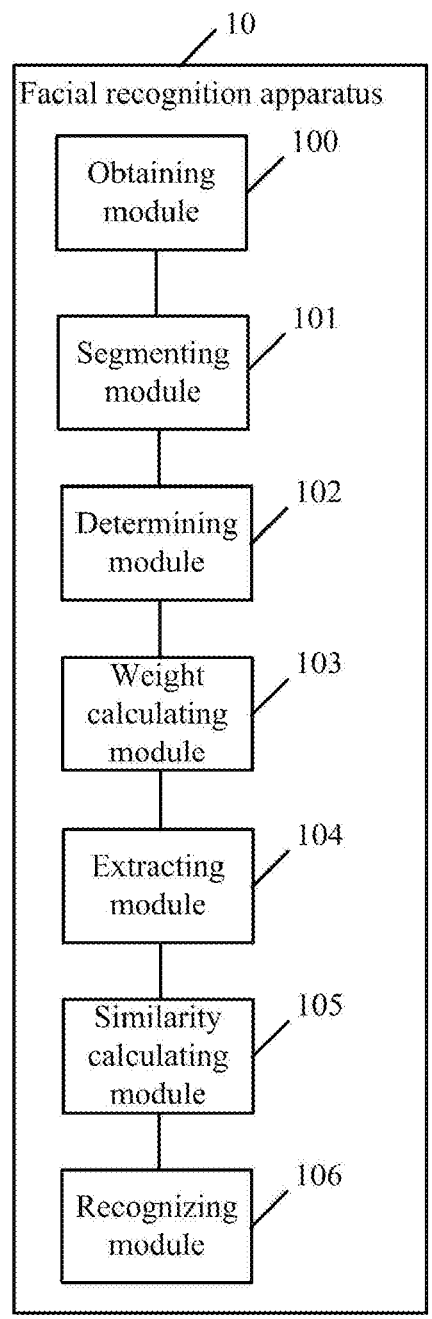
FIG. 2 is a block diagram of a facial recognition apparatus provided in one embodiment of the present invention.

Referring to FIG. 2, FIG. 2 is a block diagram of a facial recognition apparatus provided in one embodiment of the present invention. The facial recognition apparatus 10 in this embodiment includes: an obtaining module 100, a segmenting module 101, a determining module 102, a weight calculating module 103, an extracting module 104, a similarity calculating module 105, and a recognizing module 106. The module mentioned in this invention refers to a series of computer program segments that can be executed by a processing device of the facial recognition apparatus 10 and can complete fixed functions, and the computer program segments are stored, in a storage device of a base station. In this embodiment, the functions of each module are detailed in the subsequent embodiments.

The obtaining module 100 is configured to obtain a target facial image.

In at least one embodiment of the invention, the obtaining module 100 can capture images, perform facial detection on captured images by using a facial detection method, and obtain the target facial image from the captured images. In other embodiments, the obtaining module 10 can also read the target facial images from a storage device. The storage device can be an external storage device or a memory of the electronic device.

The segmenting module 101 is configured to perform image segmentation on the target facial image and obtain a covered region of the target facial image and a non-covered region of the target facial image when it is determined that there is a cover that covers a face in the target facial image.

In at least one embodiment of the invention, after the obtaining module 100 obtains the target facial image, the facial recognition apparatus includes:

the determining module 102 is configured to determine whether there is a cover that covers the face in the target facial image or not.

In one embodiment, the determining module 102 determining whether there is a cover that covers the face in the target facial image or not, includes:

the determining module 102 is configured to obtain a reconstruction facial image, calculate a difference value between the target facial image and the reconstruction facial image, determine that there is a cover that covers the face in the target facial image when the difference value is greater than or equal to a difference threshold value, and determine that there is not a cover that covers the face in the target facial image when the difference value is less than the difference threshold value.

Further, the determining, module 102 further configured to determine whether there is a cover that covers the face in the target facial image by use of a principal component analysis (PCA). In detail, the principal component analysis can be used to perform dimensionality reduction on the facial images by means of selecting pivot element features, and the data after dimensionality reduction can still maintain main features of the face. Thus, the recognition of the data after dimensionality reduction can greatly reduce the amount of calculation, that is, the amount of calculation can be greatly reduced by recognizing the data after dimensionality reduction.

In one embodiment, determining whether there is a cover that covers the face in the target facial image by use of a principal component analysis, includes:

$$m + \sum_{i=1}^{n} y_i v_i$$

is used to represent the reconstruction facial image, where m is an average face vector, which can be obtained by averaging facial sample images in a facial sample image set; $v_i$ is a vector representing the correlation between elements in the facial images. A covariance matrix can be obtained according to the facial sample images in the facial sample image set, and then a feature vector of the covariance matrix can be calculated, to obtain the vector $v_i$. The elements includes, but not limited to: pixels. i is used to represent the i-th feature vector. n represents the total number of feature vectors, and $y_i$ represents the coefficient of linear combination, which represents the degree of importance of the i-th feature vector.

$$e = m + \sum_{i=1}^{n} y_i v_i - x$$

represents a difference vector between the target facial image x and the reconstruction facial image, and $\|e\|$ represents the difference value between the target facial image and the reconstruction facial image. The larger the difference value $\|e\|$ is, the greater the probability and the severity that the target facial image is covered will be.

In at least one embodiment of the present invention, when it is determined that there is a cover that covers a face in the target facial image, because a color of the cover is very different from a color of the face, that is, because there is a big color difference between the color of the cover and the color of the face, so the segmenting module 101 can segment the target facial image by use of the color difference between the color of the cover and the color of the face, and obtain the covered region of the target facial image and the non-covered region of the target facial image. That is, because the color of the cover is very different from the color of the face, so the segmenting module 101 can perform the image segmentation on the target facial image by use of the color difference between the color of the cover and the color of the face, and obtain the covered region of the target facial image and the non-covered region of the target facial image.

In one embodiment, the binarization processing is performed on the target facial image by use of the color difference between the color of the cover and the color of the face, to obtain a binarization facial image, that is, the target facial image is processed by binarization to obtain a binarization facial image by use of the color difference between the color of the cover and the color of the face, and the binarization facial image is segmented into a black region and a white region by use of an edge detection algorithm. The black region is determined as the covered region of the target facial image, and the white region is determined as the non-covered region of the target facial image.

Furthermore, the black region and the white region can be placed in geometric shapes, that is, the black region and the white region can be enclosed in the geometric shapes. A black region or a white region can placed in a corresponding geometric shape (such as a rectangular box). The black region can be one or more, and the white region can be one or more.

The weight calculating module 103 is configured to calculate weight of the covered region and calculate weight of the non-covered region.

In at least one embodiment of the invention, a covered region corresponds to the weight of a covered region. For any covered region, the weight calculating module 103 configured to calculate weight of the covered, region, includes:

the weight calculating module 103 further configured to calculate covered area of the covered region and/or gradation degree of covered color of the covered region; determine the weight of the covered region according to an inversely proportional relationship between the covered area of the covered region and/or the gradation degree of covered color of the covered region and the weight of the covered region; and perform normalization on the weight of the covered region.

There are a lot kind of normalization methods, such as the normalization based on linear function, the normalization based on logarithmic function transformation. After the normalization for the weight of each covered region, it can avoid that input variables with different physical significance and dimension cannot be used equally, where the input variables can be: the covered area of the covered region and initial weight of the covered region, or the covered area of the covered region and the gradation degree of covered color of the covered region, etc.

When the larger the covered area of the covered region is, the smaller the weight of the covered region will be. When the larger the gradation degree of covered color of the covered region is the smaller the weight of the covered region will be. When the weight of the covered region is smaller, that is, when the weight of the cover is smaller, the contribution rate of the cover is smaller during the process of facial recognition, which can reduce the impact of the covered region on facial recognition and improve the accuracy of facial recognition.

The gradation degree of covered color of the covered region can be measured by numerical value. The darker the covered color of the covered region is, the larger the numerical value will be. The gray value of each pixel in the covered region can be accumulated, and then averaged to obtain an average gray value of each pixel in the covered region, and the average gray value can be taken as a gray value of the covered region. The gradation degree of covered color of the covered region can be determined according to the gray value of the covered region.

In one embodiment, when the weight of the covered region is determined according to the inversely proportional relationship between the covered area of the covered region and the weight of the covered region, the weight of the covered region is equal to the initial weight of the covered region divided by the covered area of the covered region, that is, the weight of the covered region can be obtained by dividing the initial weight of the covered region by the covered area of the covered region. In one embodiment, the initial weight of the covered region can be set in advance, or be obtained according to other means, such as, random variables generated by random functions, etc., or a proportion of the covered region to the target facial image, etc.

In one embodiment, when the weight of the covered region is determined according to the inversely proportional relationship between the gradation degree of covered color of the covered region and the weight of the covered region, the weight of the covered region is equal to the initial weight of the covered region divided by the gradation degree of covered color of the covered region, that is, the weight of the covered region can be obtained by dividing the initial weight of the covered region by the gradation degree of covered color of the covered region. In one embodiment, the initial weight of the covered region can be set in advance, or be obtained according to other means, such as, random variables generated by random functions etc., or the proportion of the covered region to the target facial image, etc.

In one embodiment, when the weight of the covered region is determined according to the inversely proportional relationship between the covered area of the covered region and the gradation degree of covered color of the covered region and the weight of the covered region, the weight of the covered region is equal to the initial weight of the covered region divided by a product of the covered area of the covered region and the gradation degree of covered color of the covered region, that is, the weight of the covered region can be obtained by dividing the initial weight of the covered region by the product of the covered area of the covered region and the gradation degree of covered color of the covered region. In one embodiment, the initial weight of the covered region can be set in advance, or be obtained according to other means, such as, random variables generated by random functions, etc., or the proportion of the covered region to the target, facial image, etc.

In at least one embodiment of the invention, a non-covered region corresponds to a weight of the non-covered region. For any non-covered region, the weight calculating module 103 configured to calculate weight of the non-covered region, includes:

the weight calculating module 103 further configured to identify a facial features region in the non-covered region; calculate a proportion of the facial features region in the non-covered region; determine the weight of the non-covered region according to a direct proportion relationship between the proportion of the facial features region in the non-covered region and the weight of the non-covered region; and perform normalization on the weight of the non-covered region.

There are a lot kind of normalization methods such as the normalization based on linear function, the normalization based on logarithmic function transformation. After the normalization for the weight of each non-covered region, it can avoid that input variables (such as, the proportion of the facial features region in the non-covered region, and initial weight of the non-covered region) with different physical significance and dimension cannot be used equally.

In one embodiment, the weight of the non-covered region is equal to the initial weight of the non-covered region multiplying the proportion of the facial features region in the non-covered region, that is, the weight of the non-covered region can be obtained by multiplying the initial weight of the non-covered region by the proportion of the facial features region in the non-covered region. In one embodiment, the initial weight of the non-covered region can be set in advance, or be obtained according to other means, such as, random variables generated by random functions, etc., or the proportion of the non-covered region to the target facial image, etc.

The extracting module 104 is configured to extract feature vectors of the covered region and extract feature vectors of the non-covered region.

In at least one embodiment of the invention, the extracting module 104 configured to extract feature vectors of the covered region and extract feature vectors of the non-covered region, includes:

the extracting module 104 further configured to obtain a pre-trained face feature extraction network model, where the pre-trained face feature extraction network model can be obtained by training at least one category of facial sample images, and the facial sample images of the same person belong to the same category; take images of the covered region as input of the pre-trained face feature extraction network model, and calculate the feature vectors of the covered region by using a convolutional neural network method; and take images of the non-covered region as the input of the pre-trained face feature extraction network model, and calculate the feature vectors of the non-covered region by using the convolutional neural network method.

The similarity calculating module 105 is configured to compare the target facial image with each template facial image in a facial database according to the feature vectors of the covered region, the feature vectors of the non-covered region, the weight of the covered region and the weight of the non-covered region, to calculate a facial similarity between each template facial image and the target facial image.

In at least one embodiment of the invention, for any template facial image in the template facial images, the similarity calculating module 105 configured to compare the target facial image with each template facial image in a facial database according to the feature vectors of the covered region, the feature vectors of the non-covered region, the weight of the covered region and the weight of the non-covered region, to calculate a facial similarity between each template facial image and the target facial image, includes: the similarity calculating module 105 further configured to:

(a) compare the feature vectors of the covered region with the feature vector of any template facial image, to calculate a first similarity between any template facial image and the covered region;

(b) compare the feature vectors of the non-covered region with the feature vector of any template facial image, to calculate a second similarity between any template facial image and the non-covered region;

(c) calculate the facial similarity between any template facial image and the target facial image according to the weight of the covered region, the weight of the non-covered region, the first similarity between any template facial image and the covered region, and the second similarity between any template facial image and the non-covered region;

(d) perform the steps (a), (b) and (c) for each template facial image until the facial similarity between each template facial image and the target facial image is calculated.

The facial similarity between any template facial image and the target facial image is equal to (the first similarity between any template facial image and the covered region multiplied by the weight of the covered region)+(the second similarity between any template facial image and the non-covered region multiplied by the weight of the non-covered region). That is, the facial similarity between any template facial image and the target facial image is equal to the sum of (the first similarity between any template facial image and the covered region multiplied by the weight of the covered region) and (the second similarity between any template facial image and the non-covered region multiplied by the weight of the non-covered region).

For example, the target facial image is divided into two covered regions and three non-covered regions, namely, a first covered region and a second covered region, a first non-covered region, a second non-covered region and a third non-covered region. A similarity between a template facial image and the first covered region is 0.2, and the similarity between the template facial image and the second covered region is 0.4. The similarity between the template facial image and the first non-covered region is 0.3, the similarity between the template facial image and the second non-covered region is 0.5, and the similarity between the template facial image and the third non-covered region is 0.8. The weight of the first covered, region is 0.05, the weight of the second covered region 0.08, the weight of the first non-covered region is 0.8, the weight of the second non-covered region is 0.9. and the weight of the third non-covered region is 0.7. Thus, the facial similarity between the template facial image and the target facial image is equal to (0.2*0.05+0.4*0.08–0.3*0.8+0.5*0.9+0.8*0.7).

The recognizing module 106 is configured to determine that facial recognition succeeds when at least one of the facial similarities between the template facial images and the target facial image is greater than or equal to a similarity threshold.

In at least one embodiment of the invention, when the facial recognition is determined successfully, that is, when the facial recognition is determined to be successful, the recognizing module 106 determines that the at least one template facial image and the target facial image belong to the same person.

When all the template facial images have the facial similarities to the target facial image that are less than the similarity threshold according to the facial similarity between each template facial image and the target facial image, then the recognizing module 106 determines that the facial recognition fails. That is, when the facial similarities of all the template facial images and the target facial image are less than the similarity threshold according to the facial similarity between each template facial image and the target facial image, the recognizing module 106 determines that the facial recognition fails.

When the face is covered by a cover, the facial recognition apparatus of the invention, can reduce the contribution of the cover to the calculation of the similarity between the target facial image and the template facial image, by reducing the weight of the cover in the process of facial recognition, which can reduce the impact of the cover on facial recognition and improve the accuracy of facial recognition.

The integrated modules or units, implemented as software functional modules, may be stored in a computer-readable storage medium. The software functional modules mentioned above can be stored in a storage medium and include a number of instructions for enabling a computer device (such as a personal computer, a server, or a network device, etc.) or a processor to execute partial steps of the method described in each embodiment of the invention.

Figure 3:
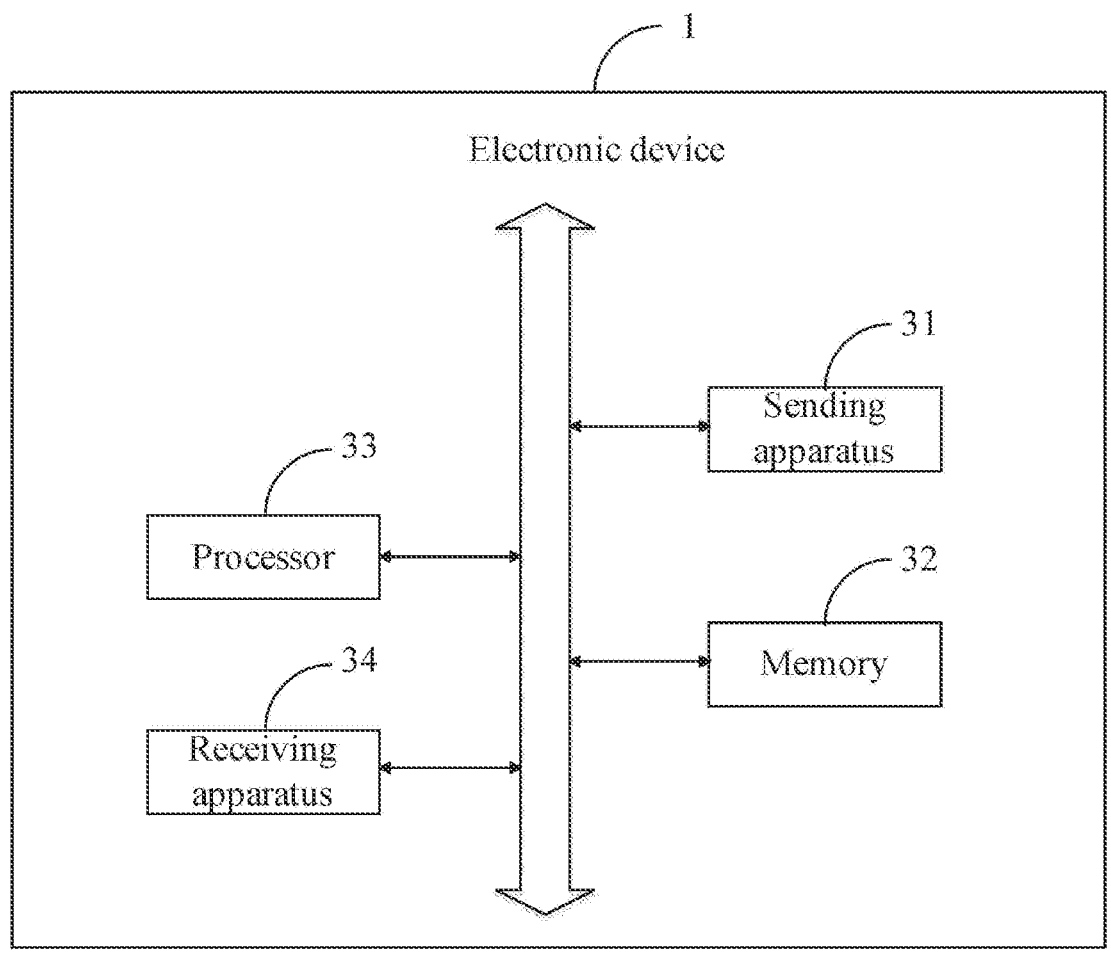
FIG. 3 is a block diagram of an electronic device provided in at least one embodiment of the present invention.

Referring to FIG. 3, FIG. 3 is a block diagram of an electronic device provided in at least one embodiment of the present invention. The electronic device 1 in the embodiment of the invention includes: at least one sending apparatus 31, at least one memory 32, at least one processor 33, at least one receiving apparatus 34, and at least, one communication bus. The communication bus is used to realize connection communication between these components, that is, the communication bus is used to realize connection communication between the sending apparatus 31, the memory 32, the processor 33, and the receiving apparatus 34.

The electronic device 1 is a device that can automatically perform numerical computation and/or information processing in accordance with pre-set or pre-stored instructions, and its hardware includes, but not limited to: a microprocessor, an application specific integrated circuit (ASIC), a field-programmable gate array (FPGA), a digital signal processor (DSP), an embedded device, etc. The electronic device 1 can also include a network device and/or a user device. The network device includes, but not limited to: a single web server, a server group composed of multiple web servers or a cloud consisting of a large number of hosts or web servers based on cloud computing. Where the cloud computing is a kind of distributed computing, which is a super virtual computer composed of a set of loosely coupled computer sets.

The electronic device 1 can be, but not limited to, any electronic product that can interact with the user by use of a keyboard, a touch pad or a voice device, such as, a tablet computer, a smart phone, a personal digital assistant (PDA), a smart wearable device, a camera device, a monitoring device and other terminals.

The network in which the electronic device 1 is located includes, but not limited to, the Internet, a wide area network, a metropolitan area network, a local area network, a virtual private network (VPN), etc.

In one embodiment, the sending apparatus 31 and the receiving apparatus 34 can be a wired sending port, or a wireless device, such as including an antenna device, for data communication with other devices.

The memory 32 is used to store program codes. The memory 32 can be a circuit with storage function without physical form in an integrated circuit, such as, a random-access memory (RAM), a first in first out (FIFO), etc. Or, the memory 32 can also be a memory with physical form, such as a memory bar, a trans-flash (TF) card, a smart media card, a secure digital card, a flash card, and other storage devices.

The processor 33 can include one or more microprocessors and one or more digital processors. The processor 33 can call the program codes stored in the memory 32 to execute relevant functions. For example, the modules described in FIG. 2 are the program codes stored in the memory 32 and executed by the processor 33 to implement a facial recognition method. Also known as the central processing unit (CPU), the processor 33 is an extremely large integrated circuit, which is a calculation core and a control unit.

The embodiment of the invention also provides a computer readable storage medium in which a number of computer instructions are stored, when the computer instructions are executed by a terminal including one or more processors, the facial recognition method as described in the embodiments above is executed by the terminal.

It should be understood that the disclosed system, device and method in the embodiments provided by the present invention can be implemented in other ways. For example, the device embodiments described above are merely schematic; for example, the division of the modules is merely a division of logical functions, which can also be realized in other ways.

The modules described as separate parts may be or may not be physically separated, and the assembly units that serve as display modules may or may not be physical units, that is, they may be located in one place, or they may be distributed over multiple network units.

In addition, each functional module in each embodiment of the invention may be integrated into a processing unit, or each unit can also physically exist separately, or two or more units can also be integrated into a unit. The integrated unit mentioned above can be realized either in the form of hardware or in the form of hardware and software functional modules.

Although the invention is described in combination with specific features and embodiments, it is evident that it can be modified and combined in various ways without departing from the spirit and scope of the invention. Accordingly, this specification and accompanying drawings are only exemplary descriptions of the invention as defined by the claims and are deemed to cover any and all modifications, variations, combinations or equivalents within the scope of the invention. The foregoing descriptions are merely exemplary embodiments of the present invention, but not intended to limit the protection scope of the present disclosure. Any variation or replacement made by persons of ordinary skills in the art without departing from the spirit of the present disclosure shall fall within the protection scope of the present disclosure. Therefore, the scope of the present disclosure shall be subject to be appended claims.

The invention claimed is:

1. A facial recognition method, comprising:
   obtaining a target facial image;
   when it is determined that there is a cover that covers a face in the target facial image, performing image segmentation on the target facial image and obtaining a covered region of the target facial image and a non-covered region of the target facial image;
   calculating weight of the covered region and calculating weight of the non-covered region;
   extracting feature vectors of the covered region and extracting feature vectors of the non-covered region;
   comparing the target facial image with each template facial image in a facial database according to the feature vectors of the covered region, the feature vectors of the non-covered region, the weight of the covered region and the weight of the non-covered region, to calculate a facial similarity between each template facial image and the target facial image; and
   determining that facial recognition succeeds, when at least one of the facial similarities between the template facial images and the target facial image is greater than or equal to a similarity threshold.

2. The facial recognition method of claim 1, the step of performing image segmentation on the target facial image and obtaining a covered region of the target facial image and a non-covered region of the target facial image, comprising:

performing binarization processing on the target facial image by use of a color difference between a color of the cover and a color of the face, to obtain a binarization facial image;

segmenting the binarization facial image into a black region and a white region by use of an edge detection algorithm;

determining the black region as the covered region of the target facial image and determining the white region as the non-covered region of the target facial image.

3. The facial recognition method of claim 1, the step of calculating weight of the covered region, comprising:

calculating covered area of the covered region and/or gradation degree of covered color of the covered region;

determining the weight of the covered region according to an inversely proportional relationship between the covered area of the covered region and/or the gradation degree of covered color of the covered region and the weight of the covered region;

performing normalization on the weight of the covered region.

4. The facial recognition method of claim 1, the step of calculating weight of the non-covered region, comprising:

identifying a facial features region in the non-covered region;

calculating a proportion of the facial features region in the non-covered region;

determining the weight of the non-covered, region according to a direct proportion relationship between the proportion of the facial features region in the non-covered region and the weight of the non-covered region;

performing normalization on the weight of the non-covered region.

5. The facial recognition method, of claim 1, the step of extracting feature vectors of the covered region and extracting feature vectors of the non-covered region, comprising:

obtaining a pre-trained face feature extraction network model, wherein the pre-trained face feature extraction network model is obtained by training at least one category of facial sample images, and the facial sample images of the same person belong to the same category;

taking images of the covered region as input of the pre-trained face feature extraction network model, and calculating the feature vectors of the covered region by using a convolutional neural network method;

taking images of the non-covered region as the input of the pre-trained face feature extraction network model, and calculating the feature vectors of the non-covered region by using the convolutional neural network method.

6. The facial recognition method of claim 1, the step of comparing the target facial image with each template facial image in a facial database according to the feature vectors of the covered region, the feature vectors of the non-covered region, the weight of the covered region and the weight of the non-covered region, to calculate a facial similarity between each template facial image and the target facial image, comprising:

(a) for any template facial image in the template facial images, comparing the feature vectors of the covered region with the feature vector of any template facial image, to calculate a first similarity between any template facial image and the covered region;

(b) comparing the feature vectors of the non-covered region with the feature vector of any template facial image, to calculate a second similarity between any template facial image and the non-covered region;

(c) calculating the facial similarity between any template facial image and the target facial image according to the weight of the covered region, the weight of the non-covered region, the first similarity between any template facial image and the covered region, and the second similarity between any template facial image and the non-covered region;

(d) performing the steps (a), (b) and (c) for each template facial image until the facial similarity between each template facial image and the target facial image is calculated.

7. The facial recognition method of claim 1, after the step of obtaining a target facial image, further comprising:

determining whether there is a cover that covers the face in the target facial image or not;

the step of determining whether there is a cover that covers the face in the target facial image or not, comprising:

obtaining a reconstruction facial image;

calculating a difference value between the target facial image and the reconstruction facial image;

determining that there is a cover that covers the face in the target facial image when the difference value is greater than or equal to, a difference threshold value.

8. A facial recognition apparatus, comprising:

an obtaining module, configured to obtain a target facial image;

a segmenting module, configured to perform image segmentation on the target facial image and obtain a covered region of the target facial image and a non-covered region of the target facial image when it is determined that there is a cover that covers a face in, the target facial image;

a weight calculating module, configured to, calculate weight of the covered region and calculate weight of the non-covered region;

an extracting module, configured to extract feature vectors of the covered region and extract feature vectors of the non-covered, region;

a similarity calculating module, configured to compare the target facial image with each template facial image in a facial database according to the feature vectors of the covered region, the feature vectors of the non-covered region, the weight of the covered region and the weight of the non-covered region, to calculate a facial similarity between each template facial image and the target facial image;

a recognizing module, configured to determine that facial recognition succeeds, when at least one of the facial similarities between the template facial images and the target facial image is greater than or equal to a similarity threshold.

9. The facial recognition apparatus of claim 8, the segmenting module configured to perform image segmentation on the target facial image and obtain a covered region of the target facial image and a non-covered region of the target facial image, comprising:

the segmenting module further configured to:

perform binarization processing on the target facial image by use of a color difference between a color of the cover and a color of the face, to obtain a binarization facial image;

segment the binarization facial image into a black region and a white region by use of an edge detection algorithm;

determine the black region as the covered region of the target facial image and determine the white region as the non-covered region of the target facial image.

10. The facial recognition apparatus of claim 8, the weight calculating module configured to calculate weight of the covered region, comprising:

the weight calculating module further configured to:

calculate covered area of the covered region and/or gradation degree of covered color of the covered region;

determine the weight of the covered region according to an inversely proportional relationship between the covered area of the covered region and/or the gradation degree of covered color of the covered region and the weight of the covered region;

perform normalization on the weight of the covered region.

11. The facial recognition apparatus of claim 8, the weight calculating module configured to calculate weight of the non-covered region, comprising:

the weight calculating module further configured to:

identify a facial features region in the non-covered region;

calculate a proportion of the facial features region in the non-covered region;

determine the weight of the non-covered region according to a direct proportion relationship between the proportion of the facial features region in the non-covered region and the weight of the non-covered region;

perform normalization on the weight of the non-covered region.

12. The facial recognition apparatus of claim 8, the extracting module configured to extract feature vectors of the covered region and extract feature vectors of the non-covered region, comprising:

the extracting module further configured to:

obtain a pre-trained face feature extraction network model, wherein the pre-trained face feature extraction network model is obtained by training at least one category of facial sample images, and the facial sample images of the same person belong to the same category;

take images of the covered region as input of the pre-trained face feature extraction network model, and calculate the feature vectors of the covered region by using a convolutional neural network method;

take images of the non-covered region as the input of the pre-trained face feature extraction network model, and calculate the feature vectors of the non-covered region by using the convolutional, neural network method.

13. The facial recognition apparatus of claim 8, the similarity calculating module configured to compare the target facial image with each template facial image in a facial database according to the feature vectors of the covered region, the feature vectors of the non-covered region, the weight of the covered region and the weight of the non-covered region, to calculate a facial similarity between <each template facial image and the target facial image, comprising:

the similarity calculating module further configured to:

(a) for any template facial image in the template facial images, compare the feature vectors of the covered region with the feature vector of any template facial image, to calculate a first similarity between any template facial image and the covered region;

(b) compare the feature vectors of the non-covered region with the feature vector of any template facial image, to calculate a second similarity between any template facial image and the non-covered region;

(c) calculate the facial similarity between any template facial image and the target facial image according to the weight of the covered region, the weight of the non-covered region, the first similarity between any template facial image and the covered region, and the second similarity between any template facial image and the non-covered region;

(d) perform the steps (a), (b) and (c) for each template facial image until the facial similarity between each template facial image and the target facial image is calculated.

14. The facial recognition apparatus of claim 8, further comprising:

a determining module, configured to determine whether there is a cover that covers the face in the target facial image or not after the obtaining module obtains the target facial image;

the determining module configured to determine whether there is a cover that covers the face in the target facial image or not, comprising:

the determining module further configured to:

obtain a reconstruction facial image;

calculate a difference value between, the target facial image and the reconstruction facial image;

determine that there is a cover that covers the face in the target facial image when the difference value is greater than or equal to a difference threshold value.

15. An electronic device, comprising a memory for storing at least one instruction and a processor, the processor for executing the at least one instruction stored in the memory to implement steps:

obtaining a target facial image;

when it is determined that there is a cover that covers a face in the target facial image, performing image segmentation on the target facial image and obtaining a covered region of the target facial image and a non-covered region of the target facial image;

calculating weight of the covered region and calculating weight of the non-covered region;

extracting feature vectors of the covered region and extracting feature vectors of the non-covered region;

comparing the target facial image with each template facial image in a facial database according to the feature vectors of the covered region, the feature vectors of the non-covered region, the weight of the covered region and the weight of the non-covered region, to calculate a facial similarity between each template facial image and the target facial image; and determining that facial recognition succeeds, when at least one of the facial similarities of the template facial images and the target facial image is greater than or equal to a similarity threshold.

* * * * *